July 4, 1961
R. JOHNSON
2,991,345
INDUCTION WELDING MACHINE WITH AUXILIARY AIR BLAST HEATING
Filed June 9, 1958
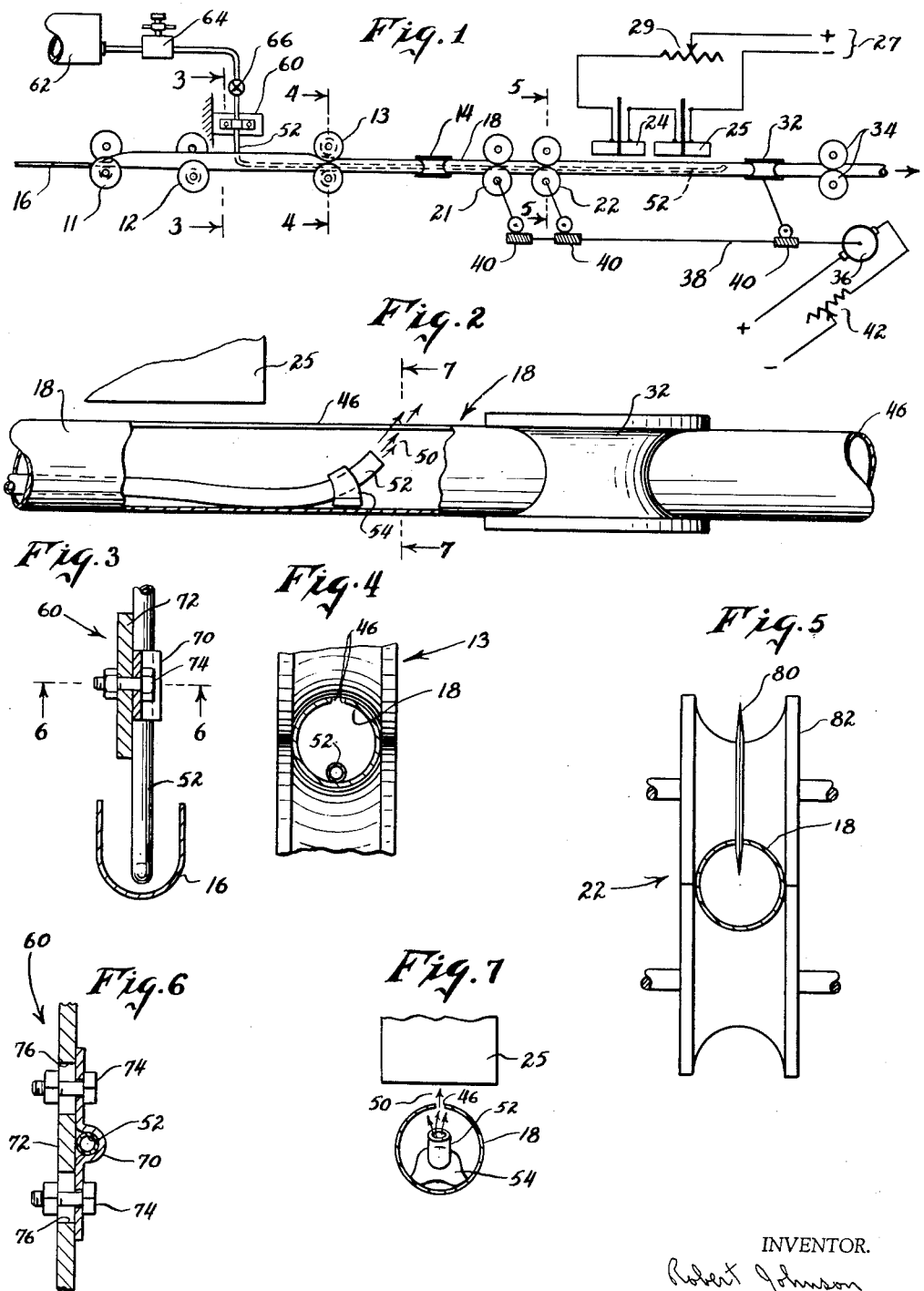
INVENTOR.
Robert Johnson
BY Emery, Whittemore,
Sandoe & Dix
ATTORNEYS

United States Patent Office 2,991,345
Patented July 4, 1961

2,991,345
INDUCTION WELDING MACHINE WITH AUXILIARY AIR BLAST HEATING
Robert Johnson, Edgeworth, Pa., assignor, by mesne assignments, to H. K. Porter Company Inc., Pittsburgh, Pa., a corporation of Delaware
Filed June 9, 1958, Ser. No. 740,726
6 Claims. (Cl. 219—8.5)

This invention relates to tube welding and more especially to the welding of longitudinal, butt seams from thin-wall stock.

It is difficult to weld thin-wall tubes at high speed by gas welding because small variations in conditions, such as gas pressure, seam width and gauge, are so critical that substantial scrap losses offset the increased production that results from the high speed.

With thin-wall tubes, electric induction heating affords a better control of the heat. Induction heating is rapid and concentrates the heat in the edges to be welded, but even with such electric heating, consistent results have not been obtained when the tube is advanced at a high rate of speed.

It is an object of this invention to obtain consistently good results when welding thin-wall tubes with induction heating at high speed, and to make such welds at higher speeds than have heretofore been practical. The new results of this invention are obtained by introducing a gas stream into the tube and impinging the gas stream against the inside wall of the tube across the seam so that the gas stream passes out of the tube between the heated seam edges before they are brought together to make the weld.

The gas stream is preferably air. It may be oxygen-enriched air, but this has been found unnecessary if sufficient volume of air is supplied in the stream. Other gas streams containing oxygen can be used, but air has the advantage of lower cost.

Another object of the invention is to provide apparatus for forming and heating thin-wall tubes and for directing a gas stream against the inside of the tube for discharge between the heated seam edges before the edges are brought together to make a weld. One feature of the invention relates to an air supply conduit with means for adjusting it axially with respect to an inductor by which the edges of the tube are heated.

Other objects, features and advantages of the invention will appear or be pointed out as the description proceeds.

In the drawing, forming a part hereof, in which like reference characters indicate corresponding parts in all the views;

FIGURE 1 is a diagrammatic view showing forming, heating and welding apparatus for making thin-wall tubes and with apparatus for supplying a gas stream inside the tube in accordance with this invention;

FIGURE 2 is a greatly enlarged view, partly in section, showing the portion of the apparatus of FIGURE 1 from the rearward end of the inductor to the welding rolls;

FIGURES 3, 4 and 5 are enlarged sectional views, taken on the lines 3—3, 4—4 and 5—5, respectively, of FIGURE 1;

FIGURE 6 is a sectional view taken on the line 6—6 of FIGURE 3; and

FIGURE 7 is a sectional view taken on the line 7—7 of FIGURE 2.

FIGURE 1 shows a tube mill having forming roll stands 11, 12, 13 and 14 which bend a flat skelp 16 into an open seam tube 18. Such tube-forming apparatus is well-known in the art and no further description of it is necessary for a complete understanding of this invention.

Beyond the forming roll stands, the tube 18 passes through guide roll stands 21 and 22, and then under inductors 24 and 25 supplied with current from a power source indicated generally by the reference character 27. The strength of the electric fields generated by the inductors 24 and 25 is adjustable, the adjustment means being illustrated diagrammatically and designated by the reference character 29.

Beyond the inductors 24 and 25, which constitute the heating station of the apparatus, the tube 18 passes between welding rolls 32 which bring the heated edges of the tube together to make a weld. The welded tube passes between sizing rolls 34, located beyond the welding rolls, and through any other roll passes or processing stations as may be necessary for the particular tube being manufactured. The drawing shows the guide rolls 21 and 22, and the welding rolls 32 driven by a motor 36 through a power shaft 38 and reduction gearing 40. This gearing is designed to obtain the desired peripheral speeds of the guide rolls and welding rolls; and the speeds of these rolls can be changed to advance the tube 18 at a slower or faster rate. The means for adjusting the tube speed is illustrated diagrammatically in the drawing and indicated by the reference character 42.

FIGURE 2 shows the tube 18 at the location where it passes from the inductor 25 to the welding rolls 32. The seam edges are spaced from one another as the seam passes under the inductor 25, but the edge faces 46 of the seam are at the same level so that they form a butt joint when brought together.

At a location just beyond the end of the inductor 25, a stream of gas 50, indicated by arrows, is discharged from a conduit 52 located within the tube 18. This gas stream 50 impinges against the inside wall of the tube 18 across the width of the seam, as is best shown in FIGURE 7, and the stream escapes from the tube 18 through the clearance between the edge faces 46 of the seam.

The location of the stream 50 lengthwise of the tube 18 is important. It must be located close to the inductor 25, but should not be under the inductor nor too close to the inductor. The exact location depends on a number of different factors such as tube speed, volume of gas, and other factors some of which are unknown. The operation of the gas stream 50 is probably a mild oxidizing action which raises the surface temperatures of the edge faces 46, but there is no blast action and there is no sparking or other manifestation which would indicate that any metal is removed. From experience in practice, every indication is that no metal is removed from the seam edges, and no oxide film is formed which impairs the quality of the weld.

In practice it has been found desirable to provide means for adjusting the position of the gas stream 50 axially, that is, with respect to the inductor 25 and the welding rolls 32. Adjustment of the stream 50 lengthwise of the tube should be made until best results are obtained. Apparently, the locating of the gas stream 50 too close to the inductor 25 prevents the stream from gaining the full advantage of heat generated in the metal.

Location of the stream 50 at a substantial distance from the inductor 25 permits some cooling of the edge faces before the gas stream strikes them, and this seems to reduce the effectiveness of the gas stream. It has been found ineffective if located too close to the welding rolls.

The invention is used effectively with seams having their edge faces spaced from one another by distances of from 1/16" to 3/32" when making 3/4" tubes having a wall thickness of 0.053 inch. With such seam clefts, the inside diameter of the discharge outlet of the gas supply conduit 52 should be approximately 5/32" but it can be somewhat smaller for the narrower width of cleft. Similar conditions are effective with ½" tubes made of skelp having a thickness of 0.041 inch.

An air pressure of eighty pounds has been used effectively with tube speeds of 200 feet per minute, and higher. The inductor should heat the edge faces of the seam to approximately 2,400° F. These figures are given merely by way of illustration.

An example of the different results obtained with and without the gas stream is that with temperatures of approximately 2,580° F. for the edge faces and speeds that were approximately 200 feet per minute, consistently good results were not obtained and higher speed resulted in even poorer results. With the gas stream of this invention and the speed increased so that the final temperature at the end of the inductor was only 2,400° F., consistently good results were obtained.

The conduit 52 is preferably a tube. By using a non-ferrous tube, heating of the conduit 52 can be reduced. In the preferred construction, at least part of the conduit 52 is made of a high temperature glass. The glass portion of the conduit extends from the discharge end and under the full length of the inductors 24 and 25 to regions of the roll stands 21 and 22. Since the conduit 52 is small and extends for a long distance through the tube 18, it must be supported from the inside wall of the tube 18 opposite the seam cleft. The tube or conduit 52 can rest directly on the inside wall of the larger tube 18, but in the construction illustrated there is a shoe 54 attached to the conduit 52 and providing a wearing surface in contact with the inside wall of the tube 18.

The conduit 52 is connected with a support 60 located between roll stands 12 and 13 of the forming mill at a location where the tube is only partially formed and there is plenty of space for the conduit 52 to extend into the partially formed tube. The gas stream is supplied to the conduit 52 from a compressed gas tank 62 through a pressure regulator 64 and shut-off valve 66.

The support 60, illustrated diagrammatically in FIGURES 3 and 6, includes a bracket 70 which clamps the conduit 52 against a plate 72. Bolts 74, by which the bracket 70 is secured to the plate 72, extend through slots 76 in the plate 72. These slots 76 have their length in the direction of movement of the tube and thus provide for adjustment of the bracket 70 and conduit 52 axially of the tube to change the location of the conduit discharge outlet with respect to the end of the inductor 25, as previously explained. This supporting structure is merely representative of adjustable supporting means for the inlet end of the conduit 52.

The conduit 52 may rest on the bottom of the larger ferrous metal tube 18 along most of the length of the conduit 52, or it may touch the bottom of the tube 18 only at spaced locations. Ordinarily, the conduit 52 is not sufficiently rigid or sufficiently straight to avoid contact with the inside of the tube 18, or to have contact throughout its entire length. It is not objectionable to have the conduit 52 touch the inside of the tube 18 and the wear shoe 54 is used only at the end of the conduit 52 where high temperature results in greater wear.

The spacing of the edge faces of the seam from one another can be controlled more accurately by providing a fin 80 (FIGURE 5) on an upper roll 82 in the guiding roll stand 22.

The preferred construction has been illustrated and described, but changes and modifications can be made and some features can be used in different combinations without departing from the invention as defined in the claims.

What is claimed is:

1. In welding ferrous metal tubes by passing an open seam tube through a heating zone with the tube in continuous motion in the direction of extent of the seam, and with the seam edges confronting but closely spaced from one another along a narrow seam cleft, heating the seam edges rapidly to a welding temperature by inductive electric heating, and then bringing the seam edges together progressively at a welding temperature and immediately beyond the heating zone, the improvement which comprises introducing gas containing oxygen into the interior of the tube through a confining passage and releasing the gas from the confinement at a location ahead of the welding region and where the seam edges are still spaced from one another, the gas being released in the interior of the tube in the forward direction in which the tube is traveling whereby the gas is carried forward by the tube and moves along the inside of the tube and escapes outwardly through the seam cleft up to the place of contact of the faces with one another, and limiting the pressure produced in the tube by the gas to a value less than that required for blowing material from the seam edges.

2. In apparatus for welding thin-wall ferrous metal tubes including in combination guide means through which a tube passes, an inductor for subjecting edges of a seam of the tube to heating by a high-frequency electric field with the seam edges adjacent to one another but with some clearance between the edge faces of the seam, the guide means including forming elements ahead of the inductor for moving the seam edges from a widely spaced relation to one another to their adjacent relation with some clearance between them, and means for bringing the seam edges together at a welding station, the improvement which comprises a gas supply conduit extending into the tube and along the interior of the tube with a discharge opening from which flows a stream of gas containing oxygen, the discharge being in the direction of the forward movement of the tube and at a location ahead of the welding station where the seam edges are still separated so that the gas stream from within the tube is carried by the tube and moves forward by the tube and moves along the inside of the tube and escapes outwardly through the seam cleft up to the place where the seam edges come into contact with one another, the cross section of the discharge being sufficient to limit the velocity of the stream to a value less than that required for blowing material from the seam edges.

3. The apparatus for welding thin-wall ferrous metal tubes as described in claim 2 and in which the gas supply conduit is a non-ferrous tube.

4. The apparatus for welding thin-wall ferrous metal tubes as described in claim 2 and in which there is a support for the gas supply conduit external of the tube, and the support is adjustable lengthwise of the tube to change the location of the discharge outlet with respect to the end of the inductor.

5. The apparatus for welding thin-wall ferrous metal tubes as described in claim 2 and in which the gas supply conduit is a tube extending within the ferrous metal tube and resting on the inside surface of the ferrous metal tube opposite the seam.

6. The apparatus for welding thin-wall ferrous metal tubes as described in claim 2 and in which there are means for adjusting the inductor to change the supply of heat generated in the tube along the seam edges, means for advancing the tube past the inductor, means for adjusting the speed at which the tube advances, and means for adjusting the gas supply conduit lengthwise of the tube to change the location of the discharge outlet with respect to the end of the inductor.

References Cited in the file of this patent
UNITED STATES PATENTS

| | | |
|---|---|---|
| 2,146,430 | Hazen | Feb. 7, 1939 |
| 2,776,474 | Melcher | Jan. 8, 1957 |